June 22, 1965    F. J. NEUGEBAUER ETAL    3,190,817
COMPRESSION DISTILLATION APPARATUS
Filed Dec. 26, 1957    9 Sheets-Sheet 2

Inventors:
Franz J. Neugebauer
Edward L. Lustenader
by J. David Blumenfeld
Their Attorney

Inventors
Franz J. Neugebauer
Edward L. Lustenader
by J. David Blumenfeld
Their Attorney

Inventors
Franz J. Neugebauer
Edward L. Lustenader
by J. David Blumenfeld
Their Attorney June 22, 1965 F. J. NEUGEBAUER ETAL 3,190,817
COMPRESSION DISTILLATION APPARATUS
Filed Dec. 26, 1957 9 Sheets-Sheet 9

Inventors
Franz J. Neugebauer
Edward L. Lustenader
by J. David Blumenfeld
Their Attorney

United States Patent Office 3,190,817
Patented June 22, 1965

3,190,817
COMPRESSION DISTILLATION APPARATUS
Franz J. Neugebauer, Schenectady, and Edward L. Lustenader, Scotia, N.Y., assignors to General Electric Company, a corporation of New York
Filed Dec. 26, 1957, Ser. No. 705,401
8 Claims. (Cl. 202—236)

Our present application is a continuation-in-part of our application Serial No. 677,628, filed August 12, 1957, now abandoned, entitled "Compression Distillation Apparatus," and which is assigned to the assignee of this present application.

Our invention relates to compression distillation apparatus. While we contemplate its particular usefulness in the distillation of sea water or brackish water to produce potable water for domestic, municipal, industrial, and agricultural uses, it has numerous other applications. For example, it is useful for the evaporation and concentration of fruit juices, and other materials in the food industry, for removing minerals and solids from brackish, waste, or irradiated water, and for other purposes.

Our invention relates more particularly to the form of such apparatus in which both evaporation and condensation take place from opposite surfaces of the same sheet of material, or heat conducting vapor barrier, and in which a pressure differential, and resultant temperature differential is applied across the barrier. Such distillation apparatus may operate at pressures in the neighborhood of atmospheric pressures or under high vacuum, as, for example, two pounds per square inch absolute. In this latter case, they are enclosed in a vacum chamber which, in large installations, because of this high vacuum, is of expensive construction.

An object of our invention is to provide such a system in which maximum effectiveness; i.e., maximum production of distillate, is obtained by accommodating a maximum amount of barrier; i.e., evaporation and condensation surface in such a vacuum chamber, thereby producing maximum utilization of the chamber.

In one form of distillation apparatus of the prior art (see Hickman Patent 2,734,023, issued February 7, 1956), the barrier is in the form of large rotating sheet metal chambers in which evaporation takes place from either the inner or outer surface and condensation takes place on the opposite surface. These chambers rotate at high circumferential speed, for example 400 r.p.m. at eight feet diameter, to distribute distilland over the surface by centrifugal force many times the force of gravity.

An object of our invention is to provide a system having thermal effectiveness approximating that obtained in systems of the type above referred to and in which all heat transfer surfaces are stationary, thereby eliminating the cost and difficulties attendant upon the use of bearings and large rotatable components, such as problems of balance, critical frequencies of rotation, etc.

Distillation systems having stationary barriers in which vaporization takes place on one side of the barrier and condensation takes place on the other are known in the art. Certain of these constructions, for example the well known Kleinschmidt still, have found considerable use in applications justifying the production of distillate at high cost, as on shipboard, but their application has been largely limited to relatively small installations. While such systems have the advantage of conserving the heat released by condensation and utilizing it to effect vaporization, their thermal effectiveness is low and, as commercially applied, the structures are expensive to construct and to operate.

A further object of our invention is to provide, in a compression distillation system, a more satisfactory means for distributing the distilland over the evaporation surface in a uniform film which has no substantial downward gravity flow component, and which covers substantially the entire evaporating surface of the barrier for most effective evaporation. At the same time, an object of our invention is to provide a system which does not have parts rotating at high speed, which does not require precision manufacture, and which is economical to produce and operate.

In accord with one form of our invention, the evaporation surface is a simple cylinder—both the inner and outer surfaces of which are in vapor which may be either at near atmospheric pressures or at high vacuum. The inner surface of the cylinder is wiped by a wiper in the form of, and which operates as, a slipper bearing which rotates about the inner periphery of the cylinder at a relatively low rate, as for example, at a suitable speed within the range from ten to one hundred revolutions per minute, or at a linear speed not exceeding five feet per second. This wiper serves to distribute the distilland over the surface in a film, the thickness of which may readily be predetermined by proper choice of the pressure of the wiper against the cylinder wall, the length of the wiper circumferentially of the cylinder, the angle between the cooperating surfaces of wiper and cylinder, and the rate of rotation of the wiper. The film thickness for any given wiper and rate of rotation may be determined in accord with the theory and calculations of slipper bearings just as lubricant film thickness in any bearing may be determined. The theory and formulae for such bearings are well known and are set forth in the text book Fluid Mechanics by R. C. Binder, published by Prentice-Hall, Inc., New York, N.Y., chapter 15, "Lubrication." The film thickness may be so adjusted that the distilland film is distributed over the inner surface of the cylinder by the rotating wiper with such thickness that it just fails of completely drying before the next wiping by the wiper. In this way, the entire surface is utilized in providing vaporization and, at the same time, the film is of minimum thickness and offers minimum impedance to heat transfer through the cylinder.

It is desirable that the surface does not dry completely between wipings for complete dryness results in high mineral concentration and subsequently boiling point elevation and in deposits of minerals upon the surface. This reduces the effectiveness of the surface and may necessitate periodic cleaning. However, it is also desirable that the film be of a thickness no greater than necessary to maintain the lowest resistance to heat flow and that the power required for operation of the wiper be maintained within economical limits. This requires proper relationship between pressure of the wiper against the wiped surface and the angle between the wiper and the surface, all as will be described hereinafter.

Our invention is not limited to cylindrical surfaces, but sheets of material of any suitable shape may be used which have high heat conductance between the surfaces. The material may be flexible so that it flexes as the wiper passes over it. This flexing aids in the prevention of the formation of deposits of minerals upon the surface and in the removal of such deposits as are formed thereon.

The novel features which we believe to be characteristic of our invention are set forth with particularity in the appended claims. Our invention itself, however, both as to its organization and method of operation, together with further objects and advantages thereof, may best be understood by reference to the following description taken in connection with the accompanying drawings, in which—

Figures 1, 1A, 1B:
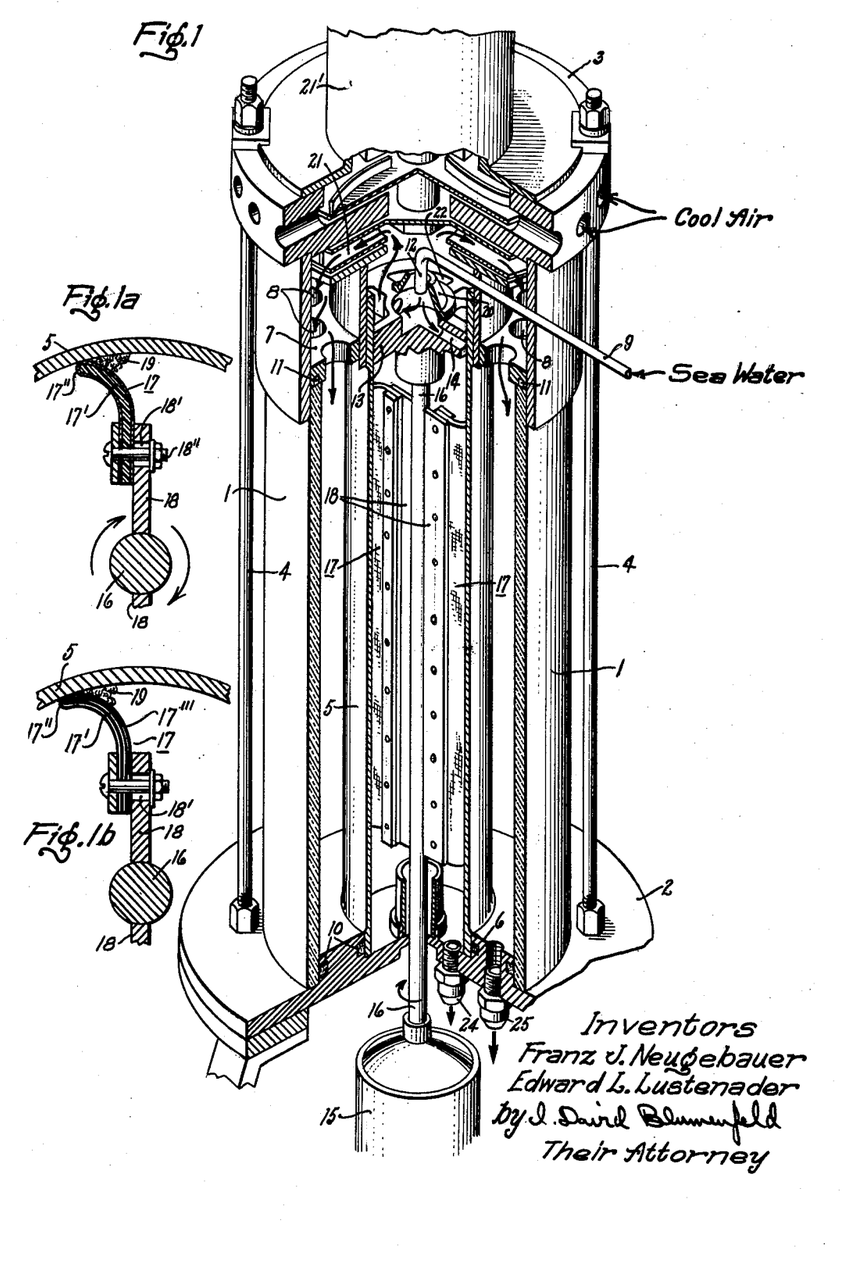
FIG. 1 represents an embodiment of our invention.
FIG. 1a illustrates one form of wiper in greater detail.
FIG. 1b illustrates a modification thereof.

Referring now to FIG. 1, we have shown our invention as comprising a cylindrical housing 1 extending between a baseplate 2 and a coverplate 3, between which plates it is held by means of rods 4. This housing, with its end enclosures, presently to be described, comprises a chamber enclosing equipment constructed in accord with our invention. This chamber may be operated at any desired pressure and temperature, including pressures in the neighborhood of atmospheric pressure. It may also, for example, be evacuated to a pressure of about two pounds per square inch absolute in any suitable way.

Within the housing 1 and coaxial therewith is a further cylinder 5 of thin material having good heat conducting properties such as copper. The bottom of cylinder 5 is spaced from the housing by a raised portion 6 of the baseplate and the top is spaced from the housing by a collar 7 having perforations 8 therein for the passage of vapor. Raised portion 6 is provided with seals 10, and collar 7 is provided with a seal 11 to seal the housing against the surrounding atmosphere.

Distilland, which may be sea water, is supplied to the inner surface of the cylinder 5 through a conduit 9, the end 12 of which is coaxial with and opens into a distributor 13. This distributor 13 has radial bores 14 which carry distilland from the conduit 9 and distribute it to the inner surface of the cylinder 5.

Distributor 13 is rotated about the axis of the cylinder by a motor 15 through a shaft 16 concentric with the cylinder. The end 12 of the conduit 9 may be suitably sealed to member 20 by means not shown to prevent escape of distilland and at the same time allow rotation of the distributor 13 about the conduit end 12.

Shaft 16 carries one or more wipers 17, of which two are shown. These wipers are attached to the shaft through radial flanges or wiper carriers 18, and said wipers bear flexibly against the inner surface of the cylinder to spread the distilland over the surface in a thin film. That is, the distilland is supplied to the surface immediately in advance of the wipers and runs down the surface on the leading side of the wipers under the influence of gravity throughout the entire length of the cylinder, the excess distilland collecting at the bottom of the cylinder and being lead off through outlet 24. The advancing wiper, acting in the fashion of a slipper bearing, spreads the distilland over the surface of the cylinder in a thin film just as a film of lubricant is formed between a bearing and journal, the thickness of the film being controlled by the design of the wiper, its pressure on the cylinder, and its rate of rotation.

To cause evaporation from the inner surface of the cylinder and condensation upon the outer surface of the cylinder, the inner surface is maintained at a lower pressure than that at the outer surface. This is effected by means of a compressor, the rotor 21 of which is driven by a motor 21'. This rotor is operated at high speed by the motor and draws vapor from within the cylinder 5 upward through apertures 22 in the distributor 13, as shown by the arrows, from which apertures vapor passes through the compressor and thence downward through further apertures 8 in the collar 7 into the annular space between cylinder 5 and housing 1. This evacuation of the inner surface of the cylinder and compression upon the outer surface of the cylinder produces a temperature differential across the barrier of, for example, five degrees Fahrenheit.

Evaporation at the inner surface, of course, removes heat from the cylinder tending to cool the cylinder and to cause condensation on the outer surface. At the same time, condensation at the outer surface releases heat which tends to heat the inner surface and cause evaporation therefrom.

Figures 20, 21:
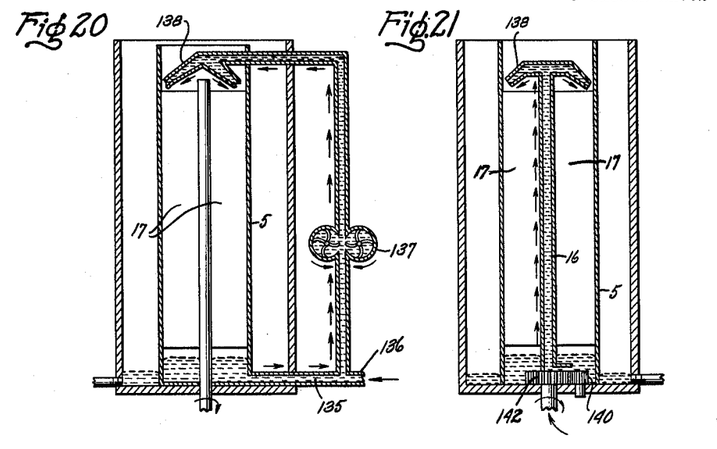
FIGS. 20 and 21 show means for recirculating excess distilland, or distilland with concentrated mineralization, through the still for further extraction of water therefrom.

The excess distilland collected at the bottom of the cylinder may, in some cases, as in the distillation of brackish water, for example, be recirculated through the still for further distillation. Means for effecting such recirculation are illustrated in FIG. 20, later to be described.

The demineralized distillate which forms on the outer surface of the cylinder 5 runs down the surface of the cylinder and may be withdrawn through the distillate outlet 25.

The wipers 17 are of suitable flexible material, metal, fiber, or plastic, which flexes backwardly so that the outer surface of the wiper cooperates with the inner surface of the cylinder in the fashion of a slipper bearing, thereby forming a thin distilland film of controllable thickness between the surfaces of the wiper and the cylinder 5 just as a film of lubricant forms between the surfaces of a journal and a bearing. The thickness of such a film can be controlled according to the ordinary laws of bearing operation. According to those laws, the determinants of film thickness are the length of the wiper surface circumferentially of the cylinder, the angle between the wiper surface and the inner surface of the cylinder, wiper speed, and pressure of the wiper on the inner surface of the cylinder. All of these parameters are controllable. The mechanism is so designed and adjusted as to these factors that the film of distilland is of optimum thickness for maximum evaporation from the surface. Of course, if the film is too thick it offers unnecessarily high resistance to heat flow. If it is too thin, the film dries up too quickly after each wiping leaving dry and, hence, non-utilized area in advance of the next wiper.

For optimum film thickness, the film dries at such a rate that the film extends from wiper to wiper, but only with such minimum thickness as to prevent drying and resulting mineral deposit on the surface. This may be effected even though the wipers rotate at a speed between 10 and 100 r.p.m., or at a speed not exceeding five feet per second. This is desirable where power consumption is a consideration. Films as thin as two ten-thousandths of an inch (.0002″) have readily been produced. Ordinarily the film will be of a thickness less than two-thousandths of an inch (.002″) when used for water distillation.

To effect such film formation, however, the wiper must be of a material that is compatible with the material of the inner surface of the cylinder 5. That is, it must not be a material that contaminates the surface to be wiped or reduces its wetting properties. It has been found that at least one variety of rubber has this objectional property. For the same reason also, the inner surface of the cylinder should be thoroughly cleansed of all grease or other contaminants, as by sanding, to remove anything likely to reduce the wetting property of the surface. Where the cylinder is of copper, the wiper may comprise a flexible strip of copper or brass, but it should be so shaped or formed as to act as a slipper bearing rather than as a scraper of the surface. That is, a slipper bearing operates by virtue of a converging area between the journal and the stationary bearing, this converging area being produced by displacement of the journal from its position when unloaded due to action of the lubricant and pressures developed therein in response to rotation of the journal under load. In this converging area, high pressures are developed sufficient to carry the bearing load, which results in the formation of a lubricating film between, and separating, the surfaces of the journal and bearing and, hence, reducing wear of the surfaces.

In our invention, the same effect occurs. Because of the small angle between the surface of the wiper and that of the cylinder, which normally will not exceed 15 degrees, at their areas of adjacency, a converging region exists and high pressures are developed in the distilland in this converging area. These pressures resist the force applied to the wiper and separate the wiper surface from the cylinder surface, thereby resulting in a uniform film at the trailing edge of the wiper.

Thus, the converging angle at the areas of adjacency of the wiper and evaporating surface is important. Parallel surfaces of wiper and cylinder in this area of adjacency are unsatisfactory. At the same time, the width of the wiper surface adjacent the cylinder in the direction of movement must be sufficient to develop load carrying pressures comparable to the force applied to the wiper in the converging area to the extent required to produce a film of desired thickness. Very narrow wiper surfaces and sharp edges engaging the cylinder or surface on which the film is to be formed, are to be avoided.

FIGS. 1a and 1b both show wipers which have been used with favorable results in structures illustrated by FIG. 1. In these figures, a strip of flexible plastic 17′ is covered by a layer of cotton cloth 17″. In FIG. 1a, where the plastic 17′ is of rubber, the cotton cloth 17″ is directly in contact with the surface of the cylinder 5. It is preferred, however, that the material of member 17′ be one that does not contaminate the surface to be wiped by wearing through of the covering 17″.

Even better results were had with the structure of FIG. 1b where a layer of glass fiber, or glass cloth, 17‴ is employed in engagement with the surface of the cylinder 5 between the cotton cloth 17″ and the surface. In this case, the member 17′ was of a plastic known on the market as "Kel F."

These wipers 17 in FIGS. 1a and 1b are bolted to the wiper carrier 18 by means of bolts 18″, which may desirably extend through elongated holes 18′ in the member 18, as shown, to provide adjustment of the wipers to produce desired pressure on the inner surface of cylinder 5, thereby to adjust the thickness of the film produced.

These FIGS. 1a and 1b both show at 19 the distilland as it flows down the inner surface of the cylinder by gravity and as it is piled up immediately in advance of the wiper. From this narrow downwardly flowing stream immediately in front of the wiper the distilland film of uniform thickness throughout the length of the wiper is formed on the inner surface of the cylinder following the wiper, the film being of such thickness that it has no flow component within it which is affected to any appreciable extent by gravity. All flowing liquid, including excess distilland and that to be distributed to areas from which it is evaporated, is confined to the stream 19 in advance of the wiper. Thus, any impairment of the thermal effectiveness of the evaporating surface by excessive flow of liquid is avoided. The surface covered by the stream 19 is very small due to the action of the moving wiper and, thus, does not substantially reduce the effective evaporating area.

This has great advantages over a falling film, since the cylinder 5 on which the film is formed may be many feet in length, twelve for example, although its diameter may be in the neighborhood of from three to six inches. A falling film of sufficient thickness to produce effective evaporation from lower areas would be so thick on the upper areas as substantially to impair the effectiveness of the upper areas. In addition, the tendencies of the liquid in a falling film to channel and cover only part of the available area is completely eliminated by the non-gravity affected, and repeatedly renewed, film produced in the operation of our device.

Our film diminishes in thickness at increasing distances from the wiper only as caused by vaporization. Thus, all areas of the vertical surface throughout the entire length of the tube may be covered by the film, which may, at any point along the length of the wiper, be of only such thickness as to extend from wiper to wiper. Thus, maximum effectiveness of the entire area of the surface in producing vaporization is obtained.

Since the wiper is flexible, it cooperates with the inner surface of the cylinder even in areas of variation therein or damage due, for example, to handling in manufacturing or shipping. The cylinder itself may very practically be of inexpensive, light weight construction. At the same time, precision manufacture is not required in the construction of the wiper.

Figure 2:
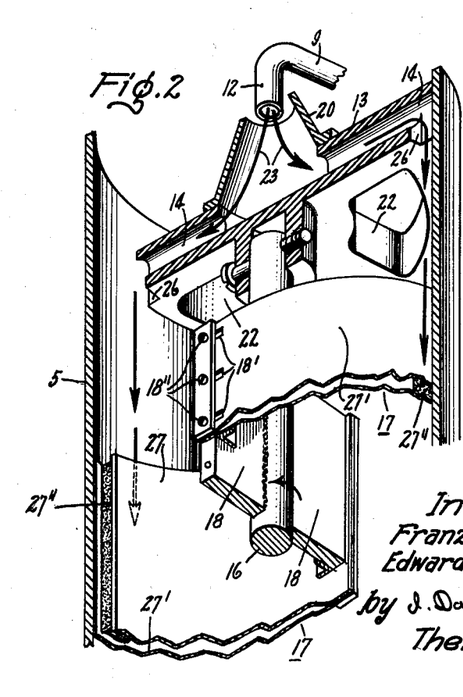
FIG. 2 is a cross-sectional view showing the distilland supply ports and conduits with still a third form of wiper for distributing the distilland over the surface of the cylinder.

FIG. 2 better portrays the rotating distributor 13 and shows the conduit 9 supplying distilland, represented by the arrows 23, as it enters the distributor and is distributed through radial bores 14 therein to the inner surface of the cylinder 5. Each of the bores has a slot 26 downward adjacent the inner surface of the cylinder so that distilland is delivered directly upon the inner surface of the cylinder 5 just ahead of each wiper 17 where it runs down the whole length of the cylinder in advance of the wiper and is spread by the wiper in a film of desired controlled thickness.

This FIG. 2 shows wipers 17 of a different construction from that previously described and which are adapted for the production of very thin films upon the surface of the cylinder 5. These wipers are better shown in FIG. 3. They comprise an inner strip 27, which may be of brass, and an outer strip 27′, which may be of stainless steel, for example. These strips are attached at one edge in any suitable manner, as by screws 18″ which extend through elongated holes 18′ in strips 27 and 27′ into the ends of the wiper carriers 18 and extend at right angles thereto. The elongated holes allow adjustment of the strips to vary the pressure of the wiper against the cylinder wall, thereby to vary the thickness of the film produced The strips are flexed backwardly in the direction opposite to the direction of rotation, and the outer strip 27′ bears against the inner surface of the cylinder 5, against which it is pressed by the somewhat stiffer strip 27, through a suitable cushioning material such as rubber or plastic 27".

It has been found that films formed by wipers of this type may be so thin that unless the wipers are rotated at relatively high speed, for example 400 r.p.m., the film formed by each wiper is likely to dry prior to the wiping by the next wiper. Where it is desired to employ such thin films, it may be desirable to increase the number of wipers, as, for example, by employing three or four wipers equally distributed about the inner circumference of the cylinder 5 and operating them at a lower speed to reduce power consumption and to avoid dry area in advance of the wipers. It is preferred that the speed of rotation be not greater than 100 r.p.m. This may be effected by adjustment of the wiper to produce smaller pressure against the wall and a resulting thicker film upon the wall. By appropriate design of the wiper, speeds as low as 10 r.p.m. may be employed.

Figure 3:
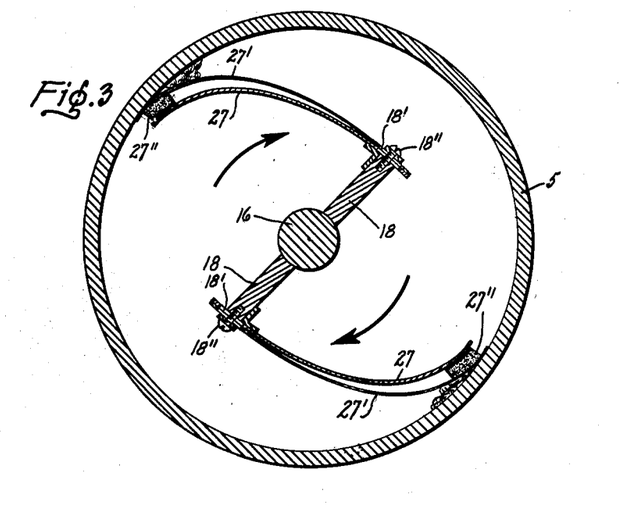
FIG. 3 is a cross-sectional view of the apparatus shown in FIG. 2.

In the forms of the invention shown in FIGS. 1-3, only a single cylinder 5 is arranged within the housing 1. In larger installations, cylinders 5 may number in the hundreds, all housed within the same housing and which may be served either by individual compressors evacuating the different cylinders, by a small number of compressors, or by a single large compressor evacuating many cylinders. Similarly, the wipers may be operated by individual motors, or by a common motor. Any of these matters might be determined by the economies of the installation.

Figure 4:
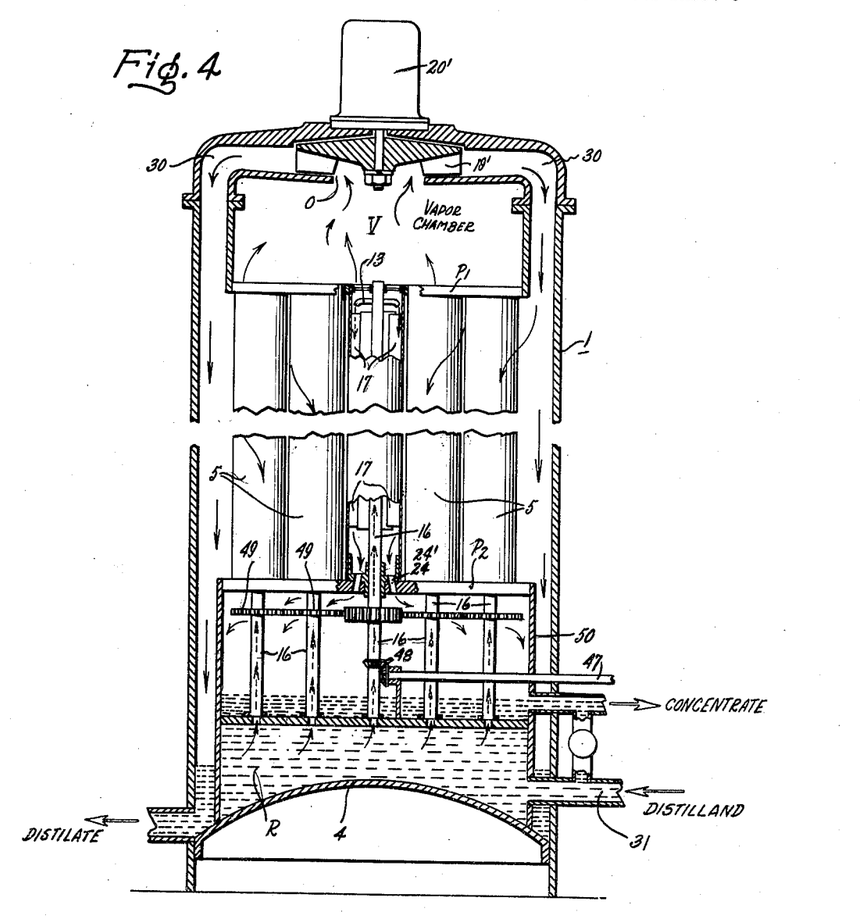
FIG. 4 shows our invention in a multi-unit still.

FIG. 4 shows a multi-unit compression distillation apparatus comprising a housing 1, which may be under sub-atmospheric pressure, enclosing a large number of cylinders 5, only five of which are shown, constructed in accord with our invention. Each cylinder has within it a rotating shaft 16 carrying distilland distributors 13 and wipers 17 to wipe the inner surface of the cylinders, all as previously described in connection with FIG. 1. These cylinders are supported in place by horizontal tube sheets P1 and P2. They extend through apertures in the upper tube sheet P1, which forms the bottom wall of a vapor chamber V, so designated on the drawing. They rest on sheet P2, which is provided with bearings 24' for the rotating shafts 16 and with apertures 24 through which excess distilland flows from within the cylinders into gear box 50 and, thence, away through the conduit designated "Concentrate" on the drawing.

Vapor chamber V has an opening O in the top wall thereof which forms the inlet to a compressor 19' driven by a motor 20'. This compressor draws vapor from the inner surfaces of the various cylinders 5 into the vapor chamber and, thence, through the compressor and discharges it through passageways 30 into the spaces between the outer surfaces of the various cylindrical vapor barriers 5. Here the vapor condenses due to the cooling resulting from vaporization inside the cylinders, and condensate runs down the outer surface of the cylindrical vapor barriers 5 onto the plate P2 and, thence, outward through the distillate output conduit designated by the legend "Distillate" on the drawing.

The shafts 16 preferably may be hollow and each of them extend downward through the gear box 50 to a reservoir R, to which distilland is supplied under pressure from a conduit bearing the legend "Distilland." From this reservoir R, the distilland is forced upward through hollow shafts 16 to distributors 13 at the upper end of the shafts which distribute it to the cylinders 5 just in advance of the wipers, as previously described.

In the gear box the shafts are provided with gears 49, which are driven in any suitable way, as through bevel gears 48, from a common shaft 47, which may be motor operated, thereby to rotate the shafts 16 and wipers 17 at a suitable speed.

This apparatus has many advantages. Many cylinders 5 may be accommodated in a given enclosure, thereby producing in extremely large ratio between area of vapor and condensate producing surfaces and the volume of the enclosure. The cylinders may be small, as, for example, of the order of six inches or less in diameter, and they may be closely spaced together. They are shown broken away at L to indicate length. They may be 10 or 12 feet in length. The various wiper carrying shafts may be geared together without mechanical difficulty. A single compressor serves adequately for many cylinders.

The apparatus once constructed is capable of operation for long periods substantially unattended. In large installations, such as those for supplying water for municipalities, equipment of this character makes possible large reductions in the cost of the building for housing the equipment, cost of plumbing, and cost of labor for operation and maintenance. This is of extreme importance in reducing the cost of the distillate.

Figure 5:
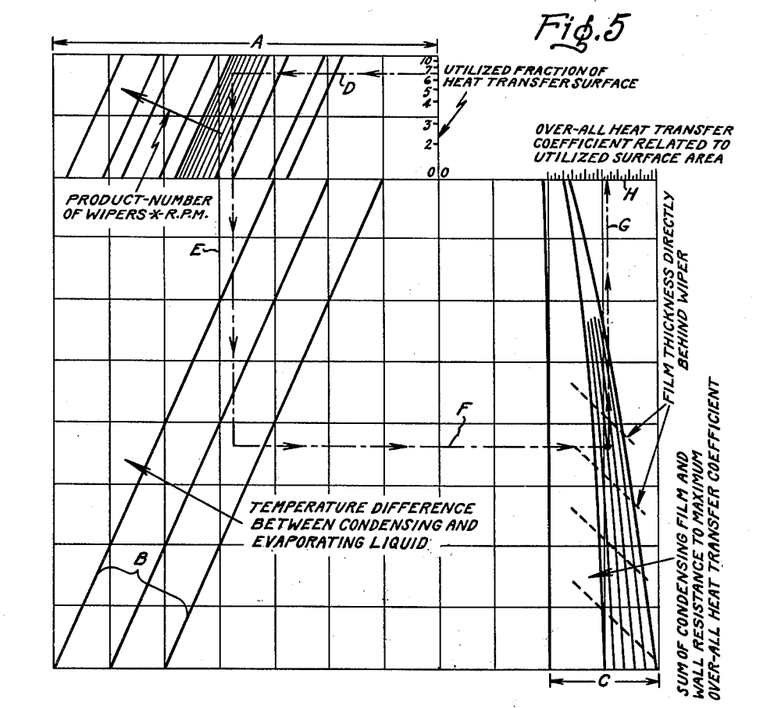
FIG. 5 shows certain characteristics of the equipment useful in determining certain adjustments for optimum performance of the apparatus.

FIG. 5 shows three interrelated groups of curves A, B, and C useful in calculating certain adjustments with the objective to optimize for maximum effectiveness of the apparatus.

The curves of group A show the relationship between the utilized fraction of the heat transfer area of the barrier plotted as ordinate and the product of the number of wipers and the number of rotations of the wipers per minute plotted as a parameter. Each curve of the group A corresponds to a different product of number of wipers times speed of the wipers in revolutions per minute.

The curves of group B each correspond to a different temperature differential across the barrier plus any distilland or distillate film thereon.

The solid curves of group C show the relation between the sum of the condensing film and wall resistances to the maximum obtainable over-all heat transfer coefficient. The dashed curves of group C indicate the required film thickness directly behind the wiper.

From these curves, assembled as illustrated in FIG. 5, the relationship between the important design and operating parameters can be read. The dotted lines and arrows show the procedure which may be followed.

Assuming, for example, that a given percentage of the area of the barrier is covered with evaporating film, the remaining portion being blocked by the wiper itself, and distilland running down the surface in advance of the wiper, a line D may be drawn horizontally to the curve group A corresponding to the product of the number of wipers used and the speed of rotation of the wipers. Thence, a line E may be drawn downward to that curve of the group B which corresponds to the temperature differential across the vapor barrier plus the films thereon. Thence, the line F may be drawn horizontally until it intersects with the solid curve of the group C which corresponds to the particular sum of the condensing film and wall resistance to heat transfer. The required film thickness directly behind the wiper may be read at this point from the dashed curves of group C. From this point, a line G may be drawn upward vertically to the scale H, designated on the drawing as "Over-all Heat Transfer Coefficient" related to utilized surface area.

Figure 6:
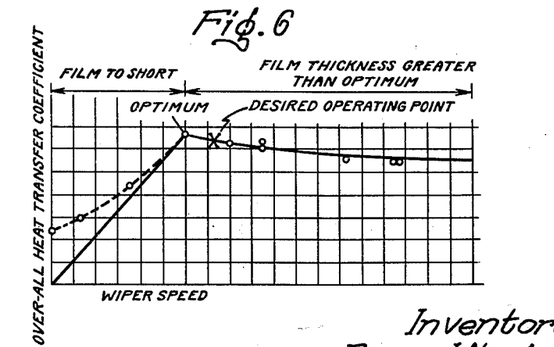
FIG. 6 shows the effect of variations in wiper speed on the over-all heat transfer coefficient in a particular apparatus.

In a similar way, a curve may be predicted such as that shown in full lines in FIG. 6. This curve shows the relation between wiper speed plotted as abscissa and the over-all heat transfer coefficient as ordinate for otherwise constant operating conditions. By varying the wiper speed and determining the over-all heat transfer coefficient as above described, an optimum point appears in the curve. This point is designated by the legend "Optimum." At this point, the rate of rotation of the wiper is just such that the film extends from wiper to wiper. It has been found preferable, however, to assure wetness of all parts of the surface with a reasonable margin of safety and in order to prevent deposit of minerals upon the surface to operate the wipers at a slightly higher speed; for example, at a speed corresponding to the point indicated by an "X" on the curve.

The dash line curve and points indicated by small circles in FIG. 6 represent actual experimentally determined results. The difference between the predicted curves and the test points at very low wiper r.p.m. is explained by the presence of superimposed "falling film," not considered in the theory, and the effect of which is negligible at normal operating r.p.m. The left extremity of the dash line curve represents the over-all heat transfer coefficient for zero wiper speed; i.e., a condition in which the film is entirely a gravity falling film. It will be seen that this coefficient is far less favorable than those represented by the portions of the curve to the right of the optimum point.

Figure 7:
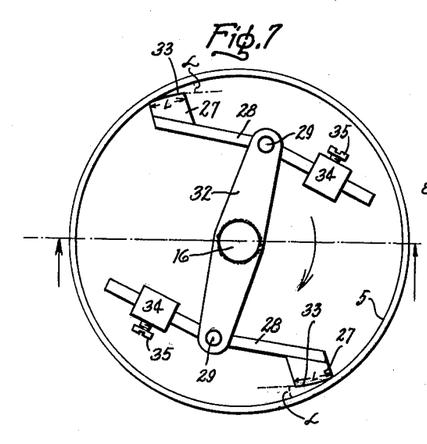
FIGS. 7 and 8 show a modification of our invention embodying a different form of wiper for the evaporating surface.

FIG. 7 shows wipers 27 of a still different form. This wiper comprises a lever 28 pivoted at an intermediate point 29 to a rotating arm 32 on the shaft 16. The shaft 16 rotates in the direction indicated by the arrow so as to carry the wipers 27 about the inner surface of the cylinder 5 against which it bears by reason of centrifugal force to distribute distilland in a thin film over such surface. These wipers 27 may be of a suitable metal, such as stainless steel, brass, or copper, or of carbon, or like material.

The external surface 33 of the wiper 27 is designed to cooperate with the inner surface of the cylinder 5 in the fashion of a slipper bearing to form a film between it and the cylinder of a thickness controlled by the applied pressure, or bearing load, the length L of the wiper, the wiper wedge angle α, and the wiper speed to produce maximum evaporation from the inner surface of the cylinder. The angle α is shown on the drawing for purposes of illustration only. In practice it may be either greater or smaller than that illustrated. The applied pressure may be adjusted by changing the position of a counterweight 34 along the length of the lever 28 opposite the wiper 27 from the pivot 29. The position of the counterweight may be secured by use of a set screw 35.

Figure 8:
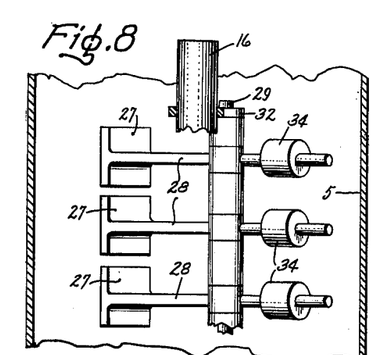

FIG. 8 shows a plurality of such wipers 27 arranged axially along the length of the cylinder in end to end relation to wipe different portions respectively of the inner surface of the cylinder. In this way, the wiper follows more effectively all portions of the cylinder even if the cylinder exhibits manufacturing irregularities. All of them are rotated together to serve as a single wiper having somewhat greater accommodation to irregularities in the surface.

Figure 9:
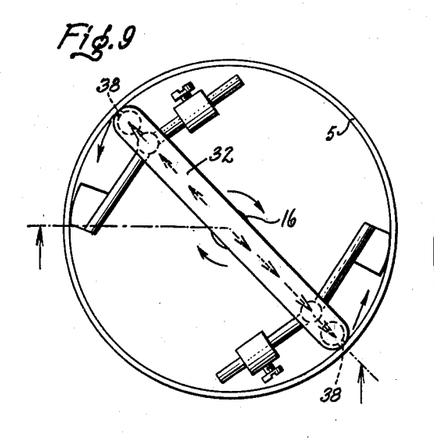
FIGS. 9 and 10 show a modification of the invention in which the distilland distribution system is combined with the wiper mechanism for more effective distribution of distilland over the evaporating surface.

FIG. 9 shows an assembly similar to that of FIGS. 7 and 8, but in which distilland is supplied through the shaft 16 to the arm 32, both of which may be hollow, from which it is released through an aperture 38 in the ends of the arm 32 onto the inner surface of the cylinder and in advance of the wiper.

Figure 10:
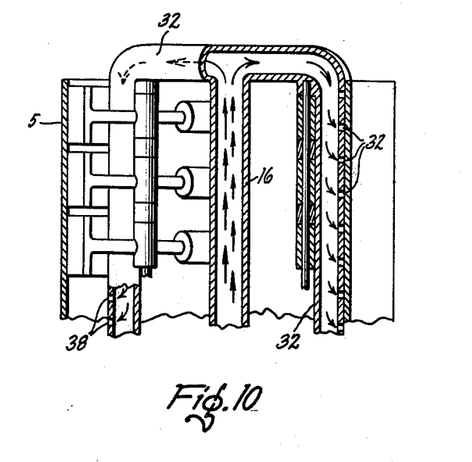

FIG. 10 shows an arm 32 extending downward inside of the cylinder and adjacent to the inner periphery thereof and having apertures 38 distributed along the length thereof to distribute distilland to all parts of the length of the cylinder. This reduces the volume of fluid in the falling stream in advance of the wiper while, at the same time, assuring an adequate supply of distilland at the lower extremities of the wiper.

Figure 11:
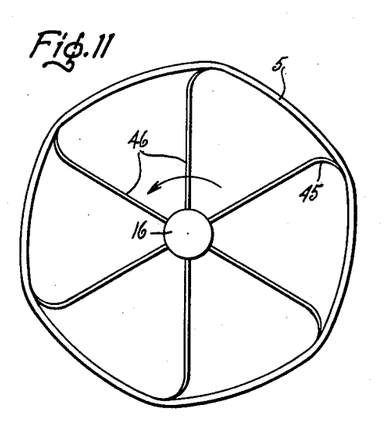
FIG. 11 shows still a further modification of the invention involving wipers of a further construction.

FIG. 11 shows a flexible cylinder 5 which is distorted by wipers 46, which may be of any suitable form, producing sufficient pressure against the cylinder to effect the distortion. They are shown in the form of slender blades extending from the axis of the cylinder and having curved ends 45 bearing against the inner surface and cooperating therewith as a slipper bearing, but with sufficient force to produce some deflection or deformation of the cylinder to reduce formation of mineral deposits thereon, or to release such deposits therefrom.

Of course, such a cylinder, flexed by the wipers, may be used in any of the forms of the invention thus far described.

Figure 12:
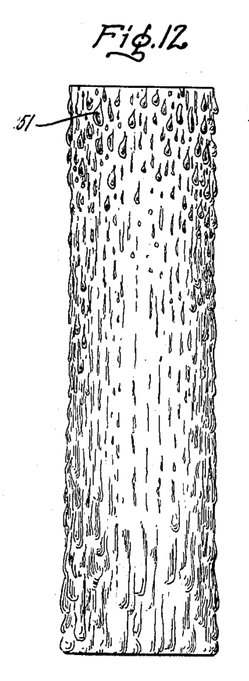
FIG. 12 shows the appearance of distillate on the outer surfaces of the cylinder 5 of the embodiment shown in FIG. 1.

FIG. 12 shows the appearance of the outer surface of the cylinder 5 during the distillation operation if dropwise condensation is applied. It will be noticed that on the upper portion of the surface large drops indicated at 51 of distillate appear, whereas farther down the surface is shown with only smaller drops clinging thereto. It has been observed in the operation of the apparatus that the distillate forms in drops which tend to cling to the surface until they become of sufficient size, as, for example, an eighth of an inch in diameter, to break loose from the cylinder under the effect of gravity and run down the surface. In doing so, they wash off many other drops, both large and small, clinging below and thus releasing such drops over a very considerable area of the surface below. This goes on continuously and accounts for the fact that fewer such drops appear in the drawing below the upper region thereon.

The dwelling of large drops of distillate on the cylinder wall is objectionable because they increase resistance to heat flow from the vapor to the cylinder. By their breaking loose and running down and thus clearing the area below of such droplets, the heat flow resistance of the cleared area is described and the area is rendered more effective in producing condensation. The effectiveness of the area still farther down, however, is again reduced by the accumulating film of distillate.

For maximum effectiveness of the condensing surface, it is desired that condensation form in individual droplets which drop off while small instead of clinging to the surface until they become large. This action may be promoted by treating the surface with certain chemicals, such as oleic acid, mercaptan, or silicon wax. However, such material washes off after short periods of use. The best permanent surface for dropwise condensation is polished chromium, but even with this surface a large area is always covered with large standing droplets which seriously reduce the heat transfer desired for maximum condensation.

Figure 13:
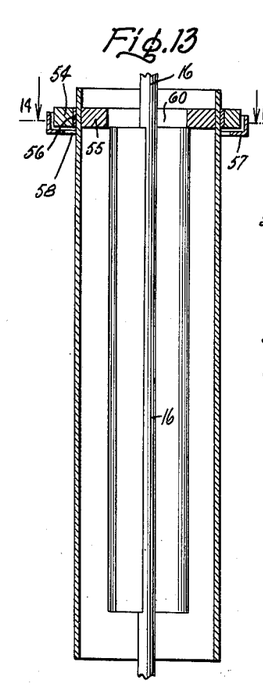
FIGS. 13, 14, and 15 show means for more effectively removing distillate from the condensing surface and increasing the production of condensate.

In accord with our invention, means are provided mechanically to disturb the clinging droplets in the upper portion of the cylinder to cause them to run down the surface and thus disturb the lower droplets and free the region of condensation. One means to effect this releasing of the droplets is shown in FIG. 13, which comprises a pair of permanent magnets 54 and 55 arranged in magnetically attracting relationship through the cylinder wall, magnet 54 being on the outside and magnet 55 being on the inside of the cylinder. The magnet 55 is rotated around the inner surface of the cylinder by rotation of the shaft 16 to which it is connected by arm 60. In such rotation, it carries with it the magnet 54, which may be provided with a bearing surface 56 of polyethylene, or other non-wetting material, such, for example, a material known on the market by the trade name "Teflon," or other similar material, between it and cylinder. This material tends to make the surface non-wetting by covering it with a molecular layer of the material itself. In its rotation about the circumference of the cylinder, the magnet 54 disturbs any droplets formed about that portion of the cylinder and causes them to run down the outer surface of the cylinder to free the cylinder of clinging droplets. The cylinder may be provided with a shelf-like projection 57 below the magnet to support the magnet in its elevated position. This shelf-like projection may be provided with apertures 58, as better shown in FIG. 14, through which the distillate drops to the lower surfaces of the cylinder.

Figure 14:
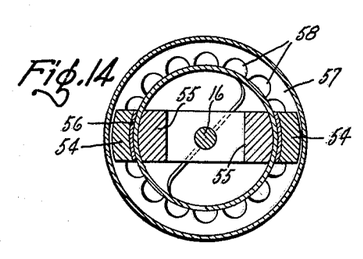

FIG. 14 is a sectional view on line 14—14 of FIG. 13.

Figure 15:
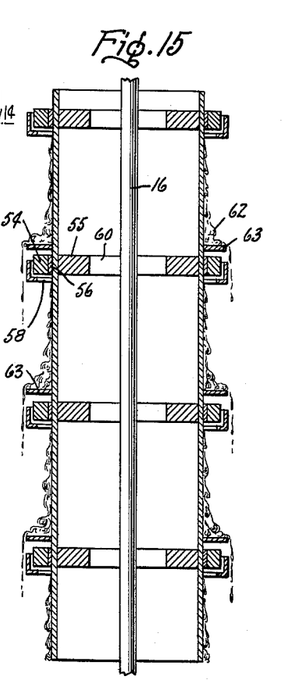

FIG. 15 shows four such assemblies, 54–60, arranged about the cylinder and spaced apart along the length thereof for better removal of condensate from the surface. It also shows at 62 such condensate as it runs down the surface of the cylinder. If desired, each of these assemblies, other than the top assembly, may be provided with a deflector 63 above it to carry the distillate running down from above outward away from the cylinder so that it may drop to the bottom without interfering with operation of the lower assembly.

By use of several such assemblies spaced along the length of the cylinder, maximum heat transfer may be achieved.

Figure 16:
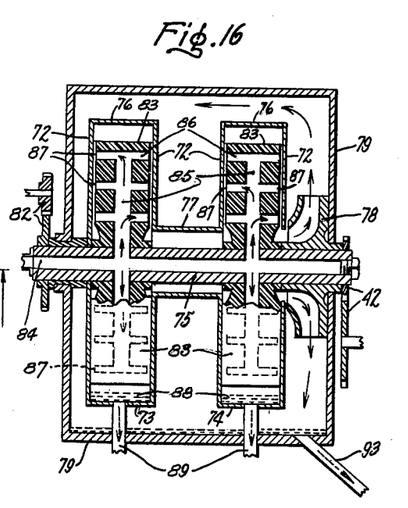
FIGS. 16 and 17 show a form of the invention in which the evaporating and condensing surfaces are flat rather than cylindrical and show further means for more effective wiping of the evaporating surface.

FIG. 16 shows a form of our invention in which pressure external to the condensing surface may aid or add to the bearing load between the wiper and the evaporation surface. In this form of our invention, the condensation surfaces are indicated at 72 and are shown as the flat broad side surfaces of hollow disks 73 and 74 arranged axially to a shaft 75 concentric with the disks. These surfaces 72 of the disks are joined together at their outer peripheries, as shown at 76, and at their inner peripheries, as shown at 77, to form a continuous hollow enclosure.

At the right of the right hand disk 74 is shown a compressor 78 which may be driven, through gears 42, by a suitable motor to evacuate the space within the several disks and to direct vapor produced therein into the outer space between the disks and the outer housing 79. The shaft 75 may be provided with reduction gears 82, the smaller one of which is driven by a motor to produce relatively slow rotation of the shaft.

The shaft 75 is provided with wipers 83, one, or any desired greater number, in each disk, each wiper extending radially from the shaft to wipe the inner surface of the disks. Distilland is carried to these surfaces through the bore 84 in the hollow shaft and through passages 85 in the wiper itself.

Figure 17:
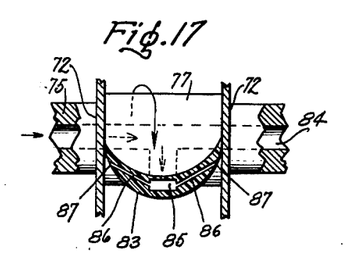

The form of this wiper is illustrated in FIG. 17, which shows a section across one of the wipers. The wiper may be of suitable metal or plastic compatible with the inner surface of the disks 73 and 74, and may be curved backward to wipe the surfaces in slipper bearing fashion. The wiper has a passage 85 extending axially of its length and lateral passages 86 to carry distilland to the evaporating surface and to discharge it at points 87, as shown in FIG. 17, just in advance of the area where the wiper contacts the evaporating surface. Any excess distilland within the disks, such as that shown at 88, may be drained off through conduits 89. Distillate which forms on the outer surface 72 of the disk collects in the bottom of housing 79 and may be drawn off through a conduit 93.

Owing to the fact that the surfaces 72 are broad, flat, and to some extent flexible, pressure on the outside and evacuation on the inside cause them to flex somewhat inwardly, thus providing any additional load needed for film control.

Figure 18:
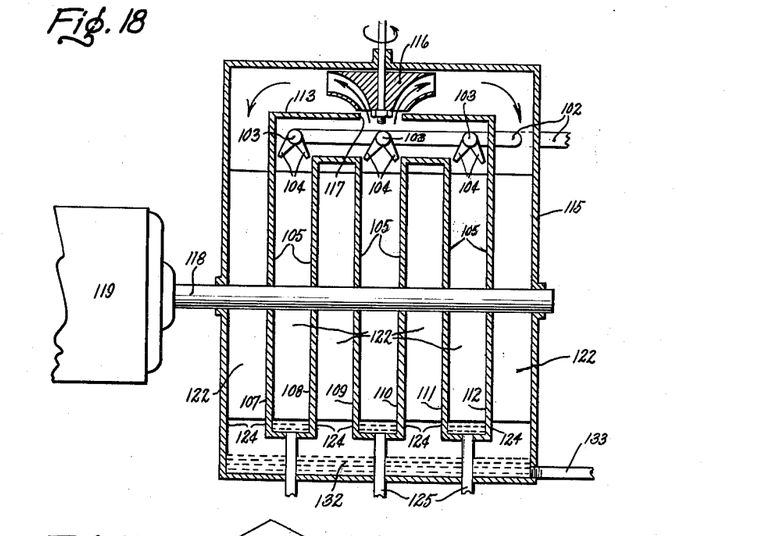
FIG. 18 shows a form of the invention employing flat surfaces and wipers for both the evaporating and condensing surfaces.
Figure 19:
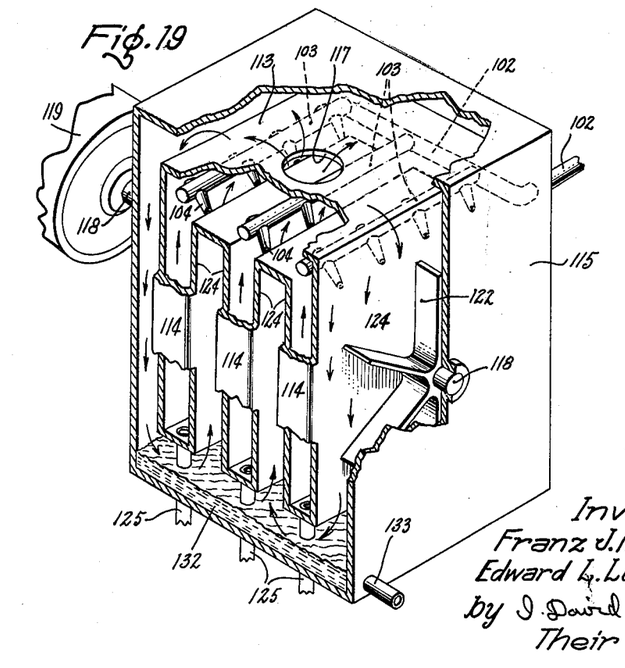
FIG. 19 shows a cutaway view in perspective of the form of the invention shown in FIG. 18.

FIGS. 18 and 19 show a further form of the invention in which both the evaporating surface and the condensing surface are wiped by wipers. In this case, distilland is supplied through conduits 102 and 103 to spray nozzles 104 arranged to spray the flat rectangular parallel surfaces 105 of sheet material. This sheet material is successively bent back upon itself to form, as shown in both figures, six parallel planes 107, 108, 109, 110, 111, and 112. The end portions may be brought together at the top to form a top surface 113 above the nozzles. The edgewise surfaces may be sealed, as shown at 114 in FIG. 19, to form a completely enclosed space between the surfaces 105 enclosing the spray nozzles for distributing liquid distilland over these surfaces. A compressor 116, shown in FIG. 18 but omitted from FIG. 19, is arranged between the top surface of enclosure 115 and the top surface 113 of the sheet, the latter of which has an aperture 117 to which the compressor is connected and through which it draws vapor from the evaporating surfaces 105 to the pressurized space outside.

Extending at right angles to all of the surfaces 105 is a drive shaft 118 rotated by a motor 119 carrying wipers 122 which wipe both the evaporating surfaces 105 and the opposing condensation surfaces 124. These members 122 may be blades, or wiper carriers, having mounted thereon wipers of any suitable type, such as those shown in FIGS. 1a, 1b, or FIG. 3, although the wipers for the condensation surfaces may be simple flat blades.

Thus, distilland enters through the conduits 102 and 103 and is sprayed by the nozzles 104 upon the evaporating surfaces 105 where it is distributed in a thin film by means of wipers 122 over so much of the rectangular surface as is wiped by the rotating wipers 122. Any excess distilland may be lead off through conduits 125.

Vapor formed upon the surfaces 105 is carried outward through an aperture 117 by the compressor 116 through the space defined by the condensing surfaces 124 and the inner surface of the housing. These surfaces 124 having been cooled by evaporation from the surfaces 105, produce condensation of the vapor. The resulting distillate collecting in the bottom of the enclosure is shown at 132 and lead off through a conduit 133.

This form of the invention has the advantage that both the evaporating surfaces and the condensation surfaces are wiped by the wipers to produce a thin film of distilland and to remove the distillate, thereby to effect maximum heat transfer through the surfaces producing evaporation and condensation.

FIG. 20 refers again to the form of invention shown in FIG. 1, but in which excess distilland collecting at the bottom of the cylinder 5 is drawn off through a conduit 135 to the input conduit 136 where it joins the fresh distilland and is pumped through pump 137 to nozzles 138 and is thus recirculated over the inner surface of the cylinder 5 in advance of the wipers 17.

In FIG. 21, excess distilland collecting at the bottom of the cylinder 5 is pumped upward by gear pump 140 through the shaft 16 of the wiper, which may be hollow, to the spray nozzles 138 above the wipers. If desired, fresh distilland may be pumped in the same way and may be admitted through the hollow shaft 16 of the larger gear 142 of the pump.

Figure 22:
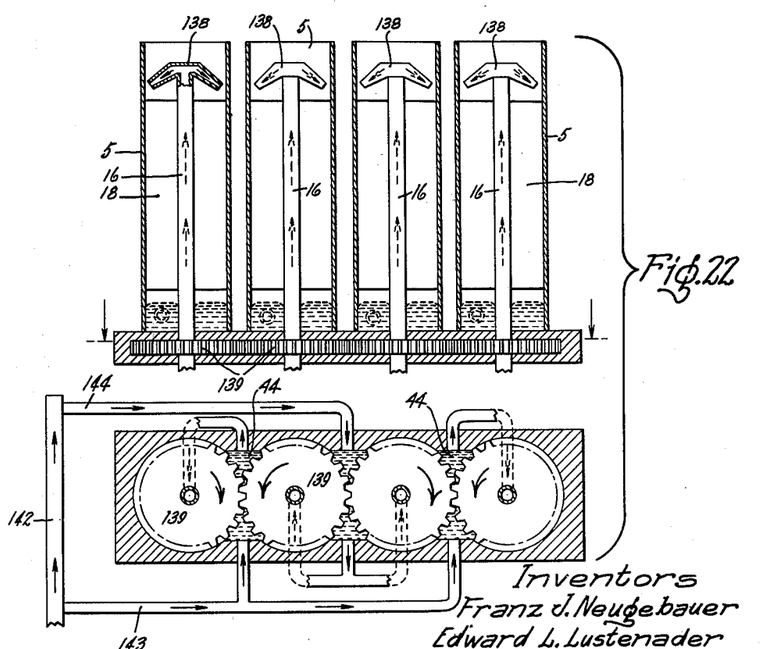
FIG. 22 shows a group of cylinders arranged together as in a multiple unit still. The particular form shown is one in which the distilland is under pressure and is used to drive the wipers of the several units.

FIG. 22 shows a number of cylinders 5 which may be arranged in close proximity to each other in a single housing, not shown, and may be evacuated by a single compressor, not shown, into the space within such housing. This structure may be utilized in equipment of the character illustrated in FIG. 4. Each cylinder may have at its top a distributor 138 fed with distilland through a hollow shaft 16 which carries the wiper carrier 18, on which may be mounted suitable wipers, not shown, and which rotates the nozzle distributor. These shafts 16 may be provided with gears 139 at their lower ends which intermesh and which may serve as a fluid motor for driving the wipers where the distilland is under pressure. Thus, distilland under pressure may be supplied through a conduit 142 to conduits 143 and 144 leading to those spaces about the gears where pressure tends to cause rotation of the gears in the desired direction. Other areas on the downstream side of the gears, as the areas 44, may be connected through suitable conduits to the hollow shaft 16, thereby to supply distilland upward through the shaft 16 to the distributor 138.

Of course, in situations where the distilland supply is not under adequate pressure, the various gears may be driven by an electric motor, as explained in connection with FIG. 4, and serve as pumps to pump distilland through the respective shafts 16 to the distributors 138, as shown in FIG. 21.

While we have shown particular embodiments of our invention, it will, of course, be understood that we do not wish to be limited thereto since many modifications may be made in the structural arrangements shown and the instrumentalities employed. We contemplate by the appended claims to cover any such modifications as fall within the true spirit and scope of our invention.

What we claim as new and desire to secure by Letters Patent of the United States is:

1. In a still, a stationary heat exchanger and phase separation barrier forming an evaporation chamber on one side and another chamber on the other side, said barrier comprising a vertically arranged cylinder of thermally conductive material forming on one of its sides an evaporating surface in heat transfer relationship with the opposite side of the barrier, means for continuously applying distilland to said evaporating surface, rotary means for spreading and flowing said distilland in a thin substantially stationary film on said evaporating surface, means including a pump for withdrawing from said evaporating chamber vapor evolved from said film of distilland and directing such vapor after discharge from said pump into intimate contact with the opposite side of said barrier for heating the same so as to transfer heat to said film on said evaporating surface to effect the evolution of vapor therefrom.

2. The still of claim 1 in which the evaporating surface is the inner surface of the cylinder.

3. The still of claim 2 in which the rotary means comprises at least two wipers extending substantially the full length of said cylinder along its vertical axis on opposite sides thereof, said wipers slowly wiping said inner surface periodically to distribute distilland in a thin film over said inner surface, the thickness of the film relative to the interval between wipings being such that the film completely evaporates in a period substantially equal to the period between wipings.

4. The combination in a compression distillation apparatus of a stationary heat exchanger and phase separation barrier forming an evaporation chamber on one side and another chamber on the other side, said barrier comprising a thin vertically arranged cylinder of thermally conductive material forming on one of its sides an evaporating surface in heat transfer relationship with the opposite side of the barrier, wiper means comprising a plurality of wipers bearing against said surface and means to actuate each wiper to wipe a portion of said surface recurrently in the same direction, means to supply distilland to such surface in advance of the wiper in sufficient quantity to run down by gravity in a stream concentrated against the leading edge of the wiper throughout the length of the wiper with excess thereof, each wiper having a bearing surface formed to cooperate with the surface of said barrier in slipper bearing fashion to produce from said stream a substantially stationary film of distilland between said cooperating surfaces due to movement of the wiper, said film being so thin that it evaporates in an interval approximating the interval prior to the next wiping thereby to produce increased evaporation from, and cooling of, said barrier, means to communicate vapor from said surface to the opposite surface of said barrier, and means operating to maintain said evaporating surface under lower pressure than said opposite surface to maintain a temperature differential across said barrier.

5. The combination of claim 4 in which the evaporating surface is the inner surface of the cylinder and said wipers are formed of a plurality of sections in end to end relation along the inner surface of the cylinder, each section being independently mounted to bear against said surface to accommodate irregularities therein.

6. The combination of claim 5 which includes means independently to adjust the pressure developed between each section of said wipers and said surface.

7. A compression distillation apparatus comprising a chamber, a vertical heat conducting cylinder supported within said chamber, said cylinder having a length at least several times its diameter, a wiper within the cylinder extending axially thereof, means to rotate said wiper about the axis of the cylinder and to distribute distilland to the upper portion of the inner surface of the cylinder just in advance of the wiper, whereby distilland flows down the surface in a stream adjacent to and preceding the wiper, means to bear said wiper resiliently against said inner surface at an angle forming a converging area between the wiper and the surface within which said stream flows downward along the surface and from which distilland is distributed by the wiper in a uniform substantially stationary film along the trailing edge of the wiper so thin that it is not affected by gravity and substantially completely evaporates before the next wiping of the surface by the wiper, means including a pump for withdrawing from said cylinder vapor evolved from the distilland therein and for directing such vapor with increased pressure into contact with the outer surface of said cylinder for heating the same so as to transfer heat to the stationary film of distilland within said cylinder to vaporize the same.

8. The combination, of a flexible stationary vertically arranged cylindrical barrier of heat conducting material, means to supply distilland to the inner surface of said barrier for evaporation thereby, a wiper arranged for rotation about the axis of said cylinder and to bear against said inner surface to distribute said distilland in a thin substantially stationary film over said surface and to distort said barrier thereby to reduce deposit of minerals from said distilland on said cylinder and to assist removal of such deposits therefrom, and means to supply vapor from said inner surface with increased pressure to said outer surface for condensation thereon, said means maintaining a temperature and pressure differential across said barrier.

References Cited by the Examiner

UNITED STATES PATENTS

| | | | |
|---|---|---|---|
| 1,501,515 | 7/24 | Testrup | 159—24 |
| 1,966,938 | 7/34 | Stone | 202—85 X |
| 2,259,024 | 10/41 | Cleveland. | |
| 2,469,729 | 5/49 | Hunter. | |
| 2,500,900 | 3/50 | Madlen | 202—205 |
| 2,542,269 | 2/51 | Zahm. | |
| 2,546,380 | 3/51 | Zahm. | |
| 2,546,381 | 3/51 | Zahm. | |
| 2,764,434 | 9/56 | Nerheim | 202—153 X |
| 2,766,193 | 10/56 | Schneider | 202—153 |
| 2,793,174 | 5/57 | Smith | 202—205 |
| 2,793,988 | 5/57 | Latham et al. | 202—75 X |
| 2,818,373 | 12/57 | Ockrent | 202—205 |
| 2,848,388 | 8/58 | Bueche | 202—236 X |

NORMAN YUDKOFF, *Primary Examiner.*

GEORGE D. MITCHELL, RICHARD D. NEVIUS, *Examiners.*